United States Patent [19]

Wendt

[11] 4,016,689
[45] Apr. 12, 1977

[54] SOUND ABSORBING PANEL SYSTEM AND METHOD FOR CONNECTING PANELS

[75] Inventor: Alan C. Wendt, Barrington, Ill.

[73] Assignee: United States Gypsum Company, Chicago, Ill.

[22] Filed: Jan. 20, 1976

[21] Appl. No.: 650,589

[52] U.S. Cl. .................... 52/145; 52/582; 52/584; 52/714; 52/747; 181/33 G

[51] Int. Cl.² .................................. E04B 1/82

[58] Field of Search ....... 181/33 G, 33 GB, 33 GD; 52/144, 145, 665, 714, 715, 357, 582, 584, 685, 456, 475, 758 A, 585, 588, 747

[56] References Cited

UNITED STATES PATENTS

| | | | |
|---|---|---|---|
| 1,567,211 | 12/1925 | Tubbs | 52/685 |
| 2,060,387 | 11/1936 | Wallis | 52/665 X |
| 2,101,551 | 12/1937 | Marsh | 403/400 X |
| 2,307,899 | 1/1943 | Olsen | 52/357 |
| 2,423,199 | 7/1947 | Milnor | 52/144 |
| 2,519,161 | 8/1950 | Tucker | 52/145 |
| 3,265,420 | 8/1966 | Goodrich et al. | 52/758 A |
| 3,934,382 | 1/1976 | Gartung | 52/144 |

Primary Examiner—Alfred C. Perham
Attorney, Agent, or Firm—Donnie Rudd; Samuel Kurlandsky; Robert H. Robinson

[57] ABSTRACT

A clip is disclosed for use in joining juxtaposed sound absorbing panels having a sound absorbing material held in a frame extending around the outer edge of the sound absorbing material, said frame having a projecting lip portion. The clip comprises a front plate having opposing end sections; offset members extending backwardly from the opposing end sections; and, opposing securing members extending downwardly from the back of the offset members. Adjacent sound absorbing panels are placed together by the securing members of the clip being placed between sound absorbing material and the frame of two adjacent panels. The sound absorbing panels may be either individual, smaller panels or may be a larger panel made up of smaller panels, stacked one on top of the other, and having a vertical frame member common to the vertical edges with the frame member having a U-shaped cross-section. Also disclosed is the sound absorbing panel system made possible by use of the clip and panels.

7 Claims, 5 Drawing Figures

SOUND ABSORBING PANEL SYSTEM AND METHOD FOR CONNECTING PANELS

BACKGROUND OF THE INVENTION

1. Field of the Invention

This invention relates to a clip for joining juxtaposed sound absorbing panels and the system made possible thereby.

2. Description of the Prior Art

In recent years, industry has become acutely aware of the problem of industrial noise pollution and has sought sound absorbing systems to overcome this problem. Heretofore, sound absorption systems have generally made use of small sound absorption panels attached rigidly to a wall in the manufacturing building. Problems have occured, however, when sound absorption was required away from a wall surface since there was no way to properly provide for support of smaller panels in this type of installation. When other known systems, such as a mere hanging of a curtain, were used in an attempt to solve the problem, they were unsuccessful because the normal height or vertical distance between the floor and ceiling in most manufacturing buildings is generally quite large, and a curtain material having sufficient strength to accommodate the distance was generally lacking in sound absorbtion qualities.

The new and novel invention described herein makes possible, for the first time, the use of small, sound absorbing panels to form curtain or wall having a substantial vertical dimension, and yet having the sound absorption qualities of the smaller panels.

SUMMARY OF THE INVENTION

It is an object of this invention to provide a clip for attaching small sound absorbing panels together to form sound absorption wall.

It is a further object of this invention to provide a low cost, easily assembled, sound absorbing panel system.

It is an additional object of this invention to provide a method for making a uniform sound absorption panel system.

This invention makes use of small sound absorbing panels, each comprising a sound absorbing material bounded on its outer edge by a frame, with the frame having a projecting lip portion. By the use of the term "small" with relation to such panels, it is intended to mean commonly available sizes of sound absorption panels, such as 2 foot by 2 foot, or 2 foot by 4 foot, or any other such conventional size which fails to meet the size requirements necessary in spanning large distances. The panels may have a single frame extending around a single piece of sound absorbing material, or they may have U-shaped horizontal frame members on the top and bottom of the sound absorbing material, with common vertical frame members extending along the vertical sides of two or more smaller sound absorbing panels, one stacked on top of the other. The frame must, however, have a projecting lip portion extending along the face of the panel.

The clip utilized to attach adjacent, smaller sound absorbing panels has a front plate of a width sufficient to span the faces of two frame members when two panels are placed side by side. The front plate may have a width only slightly larger than this distance, or it may be much larger, but on opposing sides of the front plate and spaced apart a distance only slightly greater than the extremities of the juxtaposed faces of frame mebers of panels placed side by side, are offset members extending backwardly from the opposing end sections of the front plate. The offset members have securing members extending downwardly from the back of the offset members, and the securing members are of a design sufficient to enable them to be placed between the sound absorbing material and the frame of a sound absorbing panel. The clip may be rigidly attached to the frame, if such is desired because of heavy duty usage, but this is not necessary unless the clip is in a position which will enable it to fall out of engagement in normal operation.

The most economical design for accomplishing each of these results is to have a sound absorption panel comprising a sound absorbing material supported by a frame extending around the outer edge of the sound absorbing material, and with said frame having a U-shaped cross-section. This enables the entire frame to be made out of one design of material.

While it is only necessary that the sound absorbing panel have a sound absorbing material supported by a frame of the type and description hereinbefore discussed, it has been found that one particularly acceptable type of sound absorbing panel is a sound absorbing panel having a sound absorbing material completely enclosed in a heat shrunk plastic material with the enclosed sound absorbing material then supported by the frame. In each instance, the sound absorbing material may be of any type necessary to accomplish the required sound absorption results, but it has been found to be particularly acceptable to use mineral fiber or glass fiber, having a density of from 4 to 6 pounds per cubic foot. In the preferred embodiment, the sound absorbing material may be coated with any conventional heat shrinkable plastic film, examples of which are polyvinyl chloride films, polypropylene films, polyethylene films, and the like. If desired, for additional support and protection, the enclosed sound absorbing material may, as desired, have on one or both faces, a perforated facing material such as a perforated metal and may also, if desired, have on the face opposing the source of the absorbed sound, a solid facing material for additional support.

The clip of this invention may be produced by taking a flat plate and cutting two vertical slots from one edge of the plate inward, with the slots sufficient to create a securing action upon full development of the clip. The slots are spaced apart a distance roughly equal to the width of the faces of two frame members when two panels are placed side by side. Next, the plate is bent to form offset members by bending the ends of the plate vertically through the slots until the ends of the plate point backward from the plate. This is then followed by bending the offset members at a distance roughly equivalent to the thickness of the frame members, with said bending of each end being outward until the ends generally fall in a plane parallel to the plane of the front plate. If desired, holes may be placed in the front plate or in other portions of the clip to allow attachment of the clip to the frame members by known conventional means, such as screws, brads, rivets, or the like.

While this invention, in its simplest form, uses two sound absorbing panels of the type hereinbefore described, with a clip securing the two panels together, it also encompasses a system comprised of two panel sections, of the type hereinbefore described, held together by the clip. The attachment of the clip may be in either the horizontal or vertical direction, as required by the design of the system, and, thus, it enables extention of the system in either the vertical or the horizontal direction. Additionally, the clip may be secured to either the front or the back of the sound absorbing panels, and in the case of four panels being joined together at a common corner, the front of the panels may have clips holding the panels together in the horizontal direction, and the rear surface can have clips holding the panels together in the vertical direction. For increased stability, it is ofter preferred to have clips connecting both the front and rear portions of the frame members.

Still other objects will readily present themselves to one skilled in the art upon reference to the following specification, the drawings, and the claims.

BRIEF DESCRIPTION OF THE DRAWING

This invention may be more fully described, but is not limited, by the attached drawngs wherein.

DESCRIPTION OF THE PREFERRED EMBODIMENTS

Figure 1:
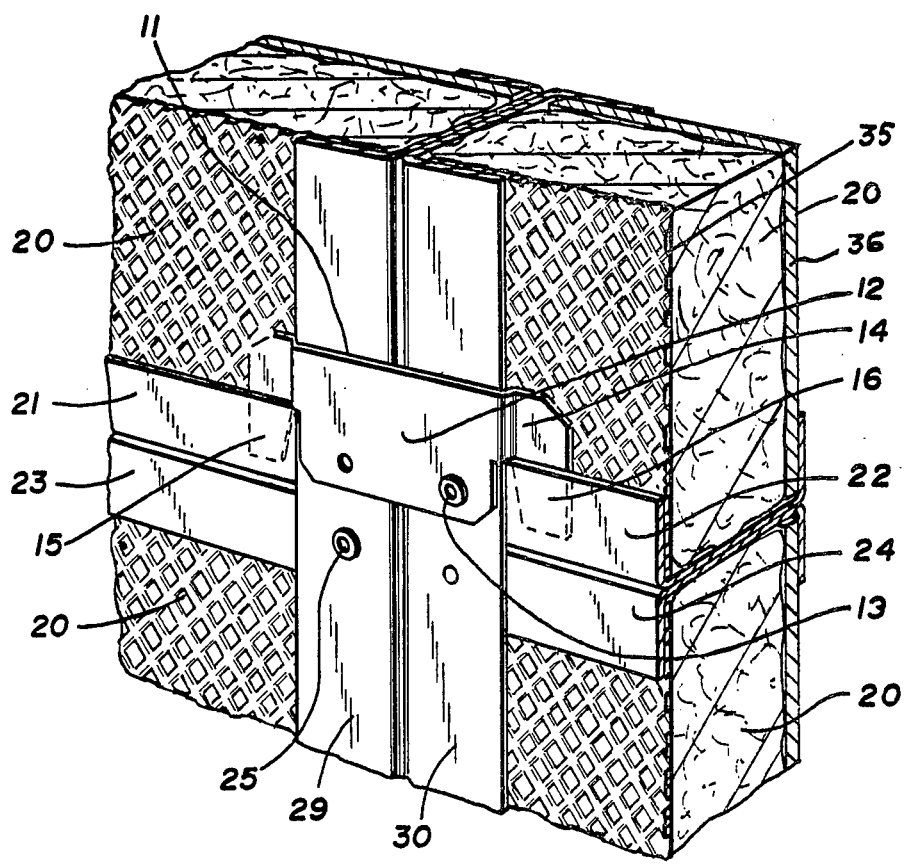
FIG. 1 is a perspective view of the panel system of this invention, utilizing the clip of this invention to attach adjacent panel section of atacked smalled panels.
Figure 2:
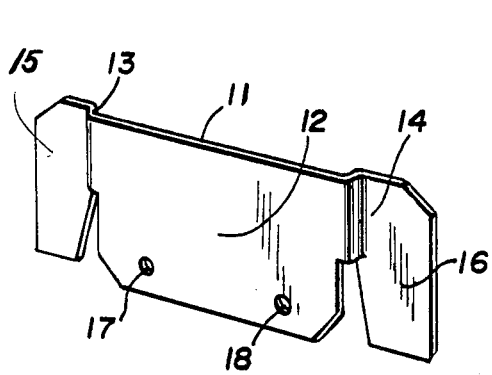
FIG. 2 is a perspective view of an embodiment of the clip of this invention.
Figure 3:
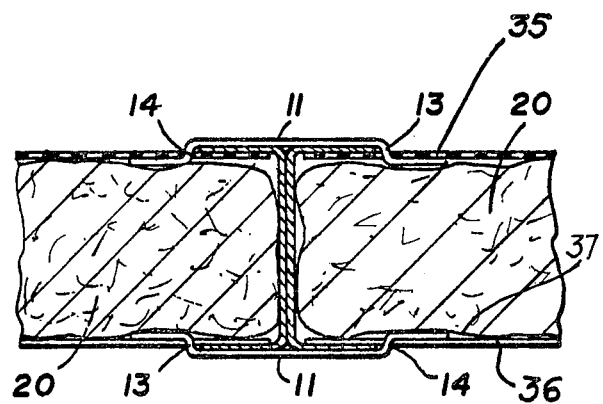
FIG. 3 is top view of the embodiment of this invention shown in FIG. 1.

This invention may be more fully described, but is not limited, by reference to the embodiments shown in the attached drawings wherein, referring to FIG. 2, a clip 11 is illustrated having a front plate 12 with offset members 13 and 14 extending backwardly from the opposing ends of the front plate. Securing members 15 and 16 extend downwardly from the back of the offset members 13 and 14 respectively. If desired, the front plate may have openings 17 and 18 therein for attachment to the frame members such as rivet 19 shown in FIG.1 and FIG. 5.

Figure 4:
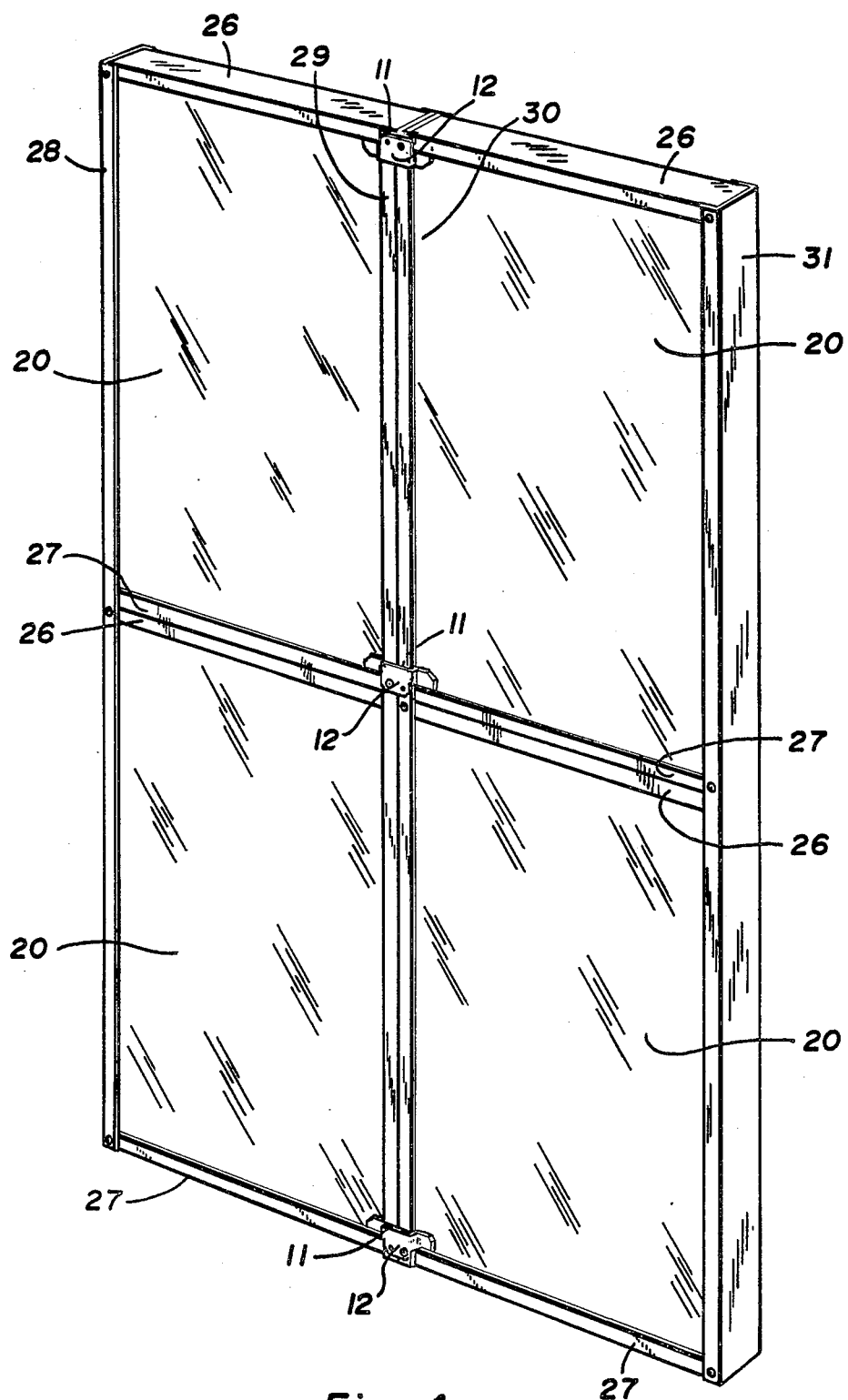
FIG. 4 is a perspective view of the system illustrated in FIG. 1 but illustrating the use of more than one clip; and, FIG. 5 is a perspective view of the sound absorbing system of this invention showing four smaller panels joined together at a common corner.

Referring now to FIG. 1, smaller sound absorbing panels are designed with a sound absorbing material 20 having, in FIG. 1, lower horizontal members 21 and 22 of a U-shaped cross-section extending along the lower edge of the upper panel sound absorbing material, and, in FIG. 1, having horizontal frame members 23 and 24, having a U-shaped cross-section, and extending along the upper edge of the lower panel sound absorbing material. The frame members may be attached together by any conventional methods, such as rivet 25 shown in FIG. 1. In FIG. 1, the panels are shown with horizontal frame members only along the edges where two smaller panels are placed together, and the top of the panel section does not have a horizontal frame member. While this design may provide some small savings in use of frame members, it is generally preferred to have every smaller panel bounded on both the top and bottom by a horizontal frame member of the type described. An example of such an embodiment is illustrated in FIG. 4 wherein the smaller panels are each bounded on their top edge by horizontal frame members 26 of a U-shaped cross-section, and the smaller panels are also bound along their lower edge by horizontal frame members 27 having a U-shaped cross-section. In this embodiment, it is possible to use both the top and bottom framing members of the entire section for attachment of the sections to the ceiling and floor of the building as desired.

Referring now to FIG. 1 and FIG. 4, vertical frame members 28, 29, 30, and 31 extend along substantially the entire vertical edges of the entire section and form the outer edges of two smaller panels which are stacked one on top of the other within the vertical frames. In FIG. 4, the two sections formed by the smaller panels are shown to be attached together by three clips with the lower two clips having their securing members pointing downward, and the upper clip having the securing members pointing upward. While all of the clips are shown rigidly attached to the frame members, the lower two clips would have stability without this rigid attachment while the upper clip would require the attachment to prevent it from falling out when exposed to the vibration caused by the sound exposure.

Figure 5:
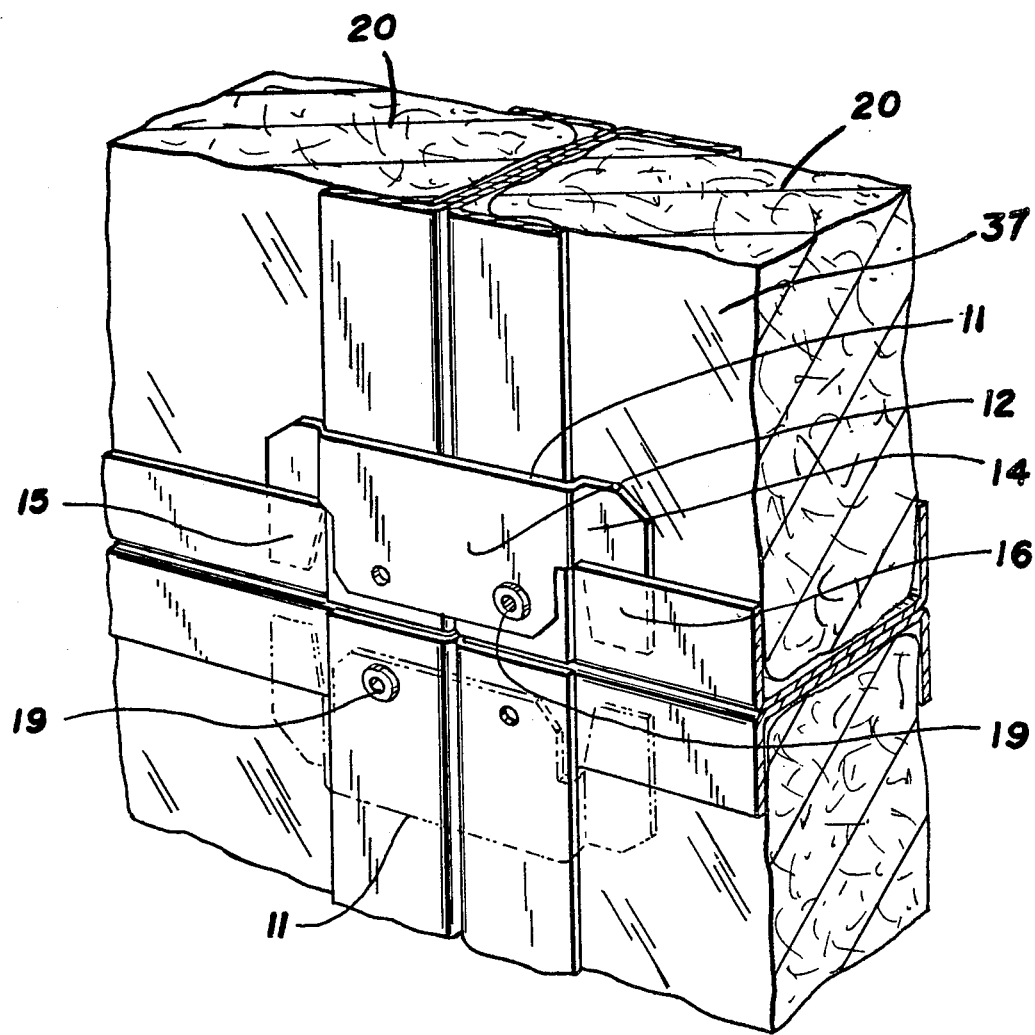

Referring now to FIG. 5, four panels are shown in an attached system with the panels all meeting at a common corner. The panels placed one on top of the other are not secured together by a common vertical frame member for the purpose of illustrating another possible embodiment of this invention. A clip is used for attaching the top two smaller panels together in the manner hereinbefore described. An inverted clip, shown in phantom, is used for attaching the lower two smaller panels together in the manner hereinbefore described. The two horizontal sections of this embodiment can be attached together by known means, such as a plate secured to adjacent horizontal frame members, or a plate secured to both clips, or the clips may be used to secure the members together vertically by using two clips appropriately placed on the back frame members and rotated 90° from the clips shown in FIG. 5. Optionally, the panel may have a perforated facing 35 on one side, a solid facing 36 on the other side, and be covered with a heat shrunk plastic 37.

While only several forms and embodiments of the invention have been shown and described, other forms and embodiments within the spirit and scope of the invention will become apparent to those skilled in the art. Therefore, the form and embodiments shown in the drawings are to be considered as merely setting forth the invention for illustrative purposes and are not intended to limit the scope of the invention herein described and shown.

It may thus be seen that the new and novel invention described herein makes possible, for the first time, the utilization of conventional-sized, smaller sound absorbing panels to form a larger sound absorbing system of any needed dimension. This is a significant advance in sound absorption design and creates a system which can be used in installations spaced apart from a wall structure.

Having fully described this new and unique invention, the following is claimed:

1. A sound absorbing panel system comprising a plurality of juxtaposed, separate sound absorbing panels attached together at their frame portions by clips; said sound absorbing panels comprising a sound absorbing material held by a frame extending around at least one vertical and at least one horizontal outer edge of the sound absorbing material, and said frame having at least one projecting lip portion; said clip comprising a front plate having opposing end sections, offset members extending backwardly from the opposing end sections, and opposing securing members extending downwardly from the back of the offset members; and, said panels being held together to form a single panel by said frame portions of adjacent panels being secured together by the front plate of said clip spanning the front or rear of the frame portions of adjacent panels and said opposing securing members extending one each inside the projecting lip portions of the frames of adjacent sound absorbing panels.

2. A system as in claim 1 wherein the frame has a U-shaped cross-section.

3. A system as in claim 1 wherein the sound absorbing panels have sound absorbing material completely enclosed by a heat shrunk plastic material.

4. A method for making a uniform sound absorption panel comprising attaching a plurality of smaller sound absorbing panels together by their frame portions to form the larger uniform panel; said sound absorbing panels comprising a sound absorbing material held by a frame extending around at least one vertical and at least one horizontal outer edge of the sound absorbing material, and said frame having at least one projecting lip portion; said clip comprising a front plate having opposing end sections, offset members extending backwardly from the opposing end sections, and opposing securing members extending downwardly from the back of the offset members; and, said panels being held together to form a single panel by said frame portion of adjacent panels being secured together by the front plate of said clip spanning the front or rear of the frame portions of adjacent panels, and said opposing securing members extending one each inside the projecting lip portions of the frames of adjacent sound absorbing panels.

5. A method as in claim 1 wherein the frame has a U-shaped cross-section.

6. A sound absorbing panel system comprising at least two sound absorbing panel sections attached together in a juxtaposed position by one or more clips; said sound absorbing sections each having vertical frame members having lip portions extending vertically along the vertical edge of the face of the section, and each section having at least two smaller panels, with one of said smaller panels stacked on top of the other, within the vertical frame members, and with each of said smaller panels being bound on at least its top or bottom horizontal edge by horizontal frame members having a lip portion extending along the horizontal edge of the section, said smaller panels each comprising a sound absorbing material bounded on its outside edges by said vertical and horizontal frame members; and, said clip comprising a front plate having opposing end sections, offset members extending backwardly from the opposing end sections, and opposing securing members extending downwardly from the back of the offset members with the panel sections attached one to the other by opposing securing members of a clip engaging adjacent smaller panels between the sound absorbing material and a horizontal frame member.

7. A system as in claim 6 wherein the frame members have a U-shaped cross-section.

* * * * *